(12) United States Patent
Berthe et al.

(10) Patent No.: US 8,434,679 B2
(45) Date of Patent: May 7, 2013

(54) MACHINE FOR PERSONALISING SMART CARDS AT HIGH RATE

(75) Inventors: Benoit Berthe, Orleans (FR); Sarah Suzanne, Montrond les Bains (FR)

(73) Assignee: DataCard Corporation, Minnetonka, MN (US)

( * ) Notice: Subject to any disclaimer, the term of this patent is extended or adjusted under 35 U.S.C. 154(b) by 379 days.

(21) Appl. No.: 12/666,114

(22) PCT Filed: Jun. 18, 2008
(Under 37 CFR 1.47)

(86) PCT No.: PCT/IB2008/001583
§ 371 (c)(1),
(2), (4) Date: Sep. 1, 2010

(87) PCT Pub. No.: WO2009/001187
PCT Pub. Date: Dec. 31, 2008

(65) Prior Publication Data
US 2011/0163157 A1   Jul. 7, 2011

(30) Foreign Application Priority Data
Jun. 27, 2007 (FR) ..................... 07 04610

(51) Int. Cl.
*G06K 5/00* (2006.01)
(52) U.S. Cl.
USPC ........................................ 235/380; 235/376
(58) Field of Classification Search .................. 235/380, 235/376
See application file for complete search history.

(56) References Cited

U.S. PATENT DOCUMENTS

| 7,921,322 | B2 * | 4/2011 | Cherpantier et al. | 713/600 |
| 8,096,719 | B1 * | 1/2012 | Bailey et al. | 400/621 |
| 2002/0179702 | A1 * | 12/2002 | Fischbacher | 235/376 |
| 2005/0218212 | A1 * | 10/2005 | Berthe | 235/380 |
| 2007/0247934 | A1 * | 10/2007 | Kagan | 365/193 |

FOREIGN PATENT DOCUMENTS

| EP | 0 797 167 | 9/1997 |
| FR | 2766945 | 2/1999 |
| WO | 01/22356 | 3/2001 |
| WO | 02/39375 | 5/2002 |
| WO | 2007/031856 | 3/2007 |

OTHER PUBLICATIONS

International Search Report for application No. PCT/IB2008/001583, dated Dec. 12, 2008.

* cited by examiner

*Primary Examiner* — Allyson Trail
(74) *Attorney, Agent, or Firm* — Hamre, Schumann, Mueller & Larson, P.C.

(57) ABSTRACT

The personalisation machine for smart cards (5) comprises an administration computer system (1) connected via at least one data personalisation transmission element (2, 200) to a turning device (3) equipped with routing means of personalisation data to locations (32) of a plurality of card locations (5). Said transmission element (2, 200) is of wired type and has a maximal data transmission capacity greater than 100 MBps (megabytes per second). To ensure a substantial processing rate with a compact machine, it is provided with:—means (4) for driving in rotation of bi-directional type for turning the device (3) around an axis (23) of rotation, said system (1) remaining fixed;—a control module (40) regularly inverting the direction of rotation of the turning device. Stops are provided for preventing rotation of the device (3) beyond one turn.

19 Claims, 4 Drawing Sheets

MACHINE FOR PERSONALISING SMART CARDS AT HIGH RATE

TECHNICAL FIELD OF THE INVENTION

The present invention relates to the field of electronic personalisation of smart cards. The invention more particularly relates to a compact and reliable electronic personalisation machine for personalising a large number of smart cards with high data transfer rates.

TECHNOLOGICAL BACKGROUND OF THE INVENTION

Personalisation systems for portable object such as smart cards are known and in particular those smart cards known as "intelligent", that is, incorporating a microprocessor or a microcalculator. In a card personalisation system, several operations can be performed, comprising operations for relief marking of the card, printing of one or more surfaces of the cards, or electronic personalisation of the memory by means of electric contacts, magnetic tracks or devices so-called without contact such as radio or induction antenna, or control of cards for purposes of personalisation.

The document EP 1 228 481 describes a card production system for programming integrated circuit cards by means of a mechanism including several card programming stations, mobile along an axis of rotation. A rotary turret can be provided for introducing cards to the programming stations and for evacuating the fully programmed cards. This type of system can produce 3000 cards per hour. However, using a rotary, fragile and easily disruptable turret can cause reliability problems.

The patent FR 97 09643 describes an electronic personalisation cylinder with several processing locations, which takes the cards on a conveyor and processes them during its rotation. The fact of having several processing locations provides the processed cards at a greater rate than the processing time of a single location would allow.

The patent EP 0 797 167 divulges a rotating plate forming cylinder provided with a plurality of connection devices and an electronic processing card associated with each connection device. Use of this type of cylinder avoids using a fragile manipulator and easily disruptable arms for sending smart cards to be personalised to the processing locations when the personalisation stations are fixed. Each of the cards to be personalised is networked to the electronic processing card embedded in the rack of the rotating plate. This electronic card can be a part of an onboard PC. The electronic processing card is generally connected to a fixed computer of PC type paced outside the cylinder. The link between the system embedded in rotation and the installation fixed is assured by a turning collector. The connection is made by fixed contacts solid with the fixed part of the machine resting on a set of turning tracks solid with the rotating plate. The same goes for the feeds, necessary for the functioning of the equipment on board the rotating plate, made by fixed contacts supported on the feed tracks. The management software for personalisation of the cards onboard the cylinder can also manage graphic marking.

A disadvantage to cylinder installations is that the turning electronic connections do not transmit data at a high rate to the electronic processing cards. The rate is of the order of several tens of megabytes per second and thus remains much lower than 1 Gbps (gigabyte per second). There is therefore a need to boost the output of personalisation machines by transferring data more quickly to the cards to be personalised.

GENERAL DESCRIPTION OF THE INVENTION

The object of the present invention is therefore to eliminate one or more of the disadvantages of the prior art by proposing a personalisation machine ensuring high-rate personalisation of smart cards of any type (or similar portable personalisable objects), with reduced bulk, and in the form of a mechanically reliable device.

To this effect, the invention relates to a high-rate personalisation machine for portable objects fitted with a chip, comprising an administration system computer equipped with communication means, at least one transmission element for personalisation data connected by a first end to the communication means of the computer system, at least one mobile device in rotation equipped with routing means of the personalisation data to locations of a plurality of locations with portable object, at least one connection interface in the mobile device receiving a second end of said transmission element, and loading means for portable objects for positioning the portable chip objects in the locations, each of the locations being provided in the mobile device, characterised in that it comprises means for driving in rotation to make the mobile device turn about an axis of rotation while said computer system remains fixed, the means for driving in rotation being of bi-directional type and associated with a control module regularly or cyclically inverting the direction of rotation of the mobile device (thus limiting the restrictions on feed elements of the control module and on transmission elements), said transmission element having a maximal data transmission capacity greater than one hundred megabytes per second and typically of the order of a gigabyte.

The machine likewise comprises for example:
first identification means for identifying a determined location vis-á-vis a loading station of the loading means;
second identification means of the portable object loaded or to be loaded in the determined location, suitable for obtaining an identifier of this portable object;
means for transmitting to the administration computer system the portable object identifier obtained; and
an association module in the administration computer system for linking personalisation data to the determined location, the association module being arranged to extract personalisation data due to the identifier obtained and for transmitting the personalisation data thus extracted in association with routing data to have the extracted personalisation data arrive at said determined location.

Thus, a high number of cards can be processed on a device in rotation (of type cylinder) at maximal data rate, while the server managing the personalisation can advantageously be placed outside the part mobile in rotation. The control module limits the torsion movement of the high-rate bundle of wires providing personalisation data from the administration computer system.

According to another particular feature, the control module is configured to limit each of the rotations of the mobile device to an angle of the order of 360°.

According to another particular feature, the control module comprises control means of at least one angular position taken by the mobile device.

According to another particular feature, the control module comprises detection means for permanently verifying the angular position taken by the mobile device.

According to another particular feature, the personalisation machine comprises stop members for preventing rotation of the mobile device beyond one turn.

Therefore, any possible programming errors cannot result in harmful equipment accidents.

According to another particular feature, the mobile device forms a cylinder with locations for portable object distributed about the axis of rotation.

According to another particular feature, each transmission element of personalisation data consists of a cable suitable for undergoing torsion between the first and the second end.

According to another particular feature, said transmission element of personalisation data consists of a single cable, the second end being connected to a data redistributor connected in the mobile device to a plurality of processing devices each coupled to at least one of the locations for transferring personalisation data received via the redistributor to the chips of the portable objects housed in the corresponding locations.

According to another particular feature, the redistributor stores in a memory an IP address table for each of the processing devices and comprises means for distributing personalisation data received via the transmission element to the processing devices by consultation of the table, using IP address indicators supplied by the administration computer system.

According to another particular feature, several cables connect the mobile device to a fixed set including the administration computer system.

According to another particular feature, the communication means of the computer system comprise communication ports each connected in the fixed set to a connector on a processing device for transmitting the personalisation data to several portable objects with chips loaded in locations of the same set of locations of the mobile device (same mobile subset), each processing device of the fixed set being specifically connected to a single set among a plurality of sets of locations provided in the mobile device of the machine.

According to another particular feature, the communication means of the computer system comprise communication ports connected via cables to connectors of the connection interface of the mobile device, each of the connectors being connected in the mobile device to a processing device provided for transmitting the personalisation data to several portable chip objects loaded in locations of the same set of locations of the mobile device, each processing device being specifically connected to a single set among a plurality of sets of locations provided in the mobile device of the machine.

According to another particular feature, the communication means of the computer system comprise communication ports connected to USB connectors provided in the connection interface of the mobile device, each of the USB connectors being connected in the mobile device to a router for transmitting the personalisation data to several portable chip objects loaded in locations of the same set of locations of the mobile device (same mobile subset), each connector USB of the mobile device being specifically connected to a single set among a plurality of sets of locations provided in the mobile device of the machine.

According to another particular feature, the personalisation machine comprises a transfer line of portable chip objects for introducing and extracting the portable objects of the mobile device, the axis of rotation of the mobile device being placed transversally relative to the transfer line, each transmission element extending according to a specific direction parallel to the axis of rotation.

According to another particular feature, each processing device is connected to the administration computer system and is placed radially in the mobile device in rotation, the administration computer system of the personalisations managing the set of portable objects housed in the locations of the mobile device.

According to another particular feature, the loading means are arranged to load a first series of locations separated two by two by an intercalary location when the mobile device turns in a first direction, and for loading a second series of locations corresponding to the intercalary locations when the mobile device turns in a second direction.

Therefore, the rate of the personalisation machine can be advantageously high despite the change in direction of rotation of the mobile device where the smart cards are personalised.

According to another particular feature, the control module inverts the direction of rotation of the mobile device as a function of a detection signal supplied by a sensor (for example an optical sensor) linked to an angular reference position of the mobile device.

According to another particular feature, the association module extracts the personalisation data by consulting a correspondence table stored in the administration computer system, by use of the identifier obtained as input key of the correspondence table.

According to another particular feature, the communication means of the administration computer system are arranged for transmitting personalisation data including numerical data, graphical or alphanumerical data, biometric data, or any combination of these types of data.

The invention, with its characteristics and advantages, will emerge more clearly from the description given in reference to the attached drawings, in which:

FIG. 1 schematically illustrates a first embodiment of the invention;

FIG. 2 schematically illustrates a second embodiment of the invention;

FIG. 3 schematically illustrates a third embodiment of the invention;

FIG. 4 schematically illustrates a fourth embodiment of the invention;

DESCRIPTION OF THE PREFERRED EMBODIMENTS OF THE INVENTION

Figure 1:
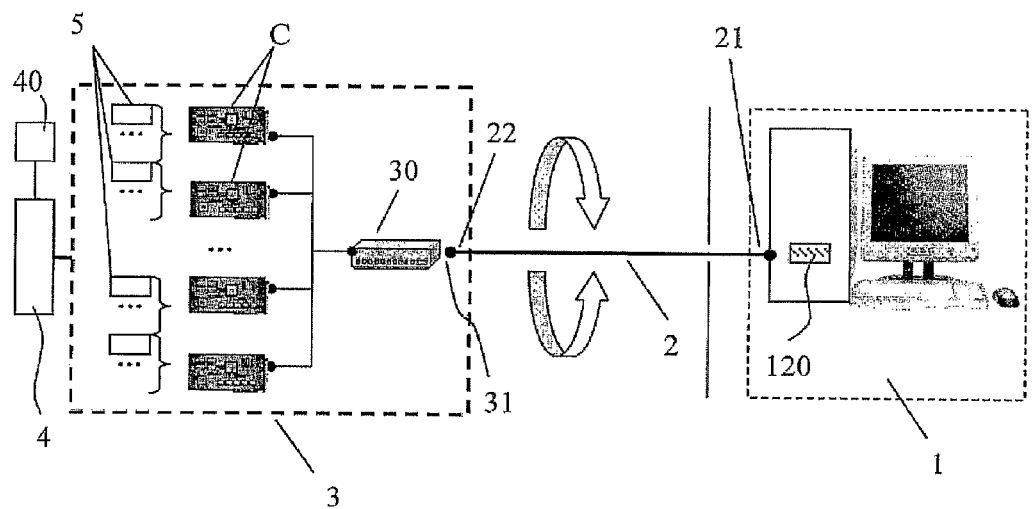

The personalisation machine which will be described in relation to FIGS. 1 to 5 comprises a fixed part and a part mobile in rotation. This type of machine can comprise a transfer path formed by a continuous notched belt Cc circulating between two end pulleys 51, 52 whereof one is driven by a motor M. Other means of conveying can naturally be used as those skilled in the art can appreciate.

The machine enables high-rate personalisation of smart cards 5 or portable objects fitted with a chip. An administration computer system 1 equipped with communication means 120, 121, 122, 123 manages the personalisation of several cards 5 in a centralised manner, by providing as a function of the addressees of the cards 5 so-called specific personalisation data. This system 1 is placed in the fixed part, as illustrated in FIGS. 1 to 4. At least one transmission element 2, 200 of personalisation data, of wire type, connects the system 1 to the device 3 mobile in rotation. The transmission element or the elements 2, 200 are each connected by a first end 21 to the communication means 120, 121, 122, 123 of the computer system 1, while the second end 22 is received at the level of a connection interface 31 in at least one mobile device 3.

The device 3 mobile in rotation is equipped with routing means of personalisation data to locations 32 on a smart card 5. In an embodiment of the invention, a connection device 11*i* is provided for placing the card into conditions for receipt of personalisation data. This device 11*i* is fitted with a connection head with which a card 5 is associated for its personalisation. The connection device 11*i* can be maintained in the turning device 3, and can comprise a loading/guiding mobile part or be removable relative to a card location 32 of the turning device 3.

The personalisation machine advantageously comprises means 4 for driving in rotation to turn the mobile device 3 around an axis 23 of rotation while said computer system 1 remains fixed. These means 4 for driving in rotation are of bi-directional type and linked to a control module 40 regularly inverting the direction of rotation of the mobile device 3. Said transmission element 2, 200 is selected for example from cables having maximal data transmission capacity greater than a hundred megabytes per second. The fact of alternating the movement of the mobile device causes limited torsion of the cable or cables (bundle of wires/cables) at high rate. The fact of having a mobile device 3 for receiving the cards to be personalised and receiving data at a very high rate considerably increases the personalisation rate, with a higher number of cards able to be processed for the same period as compared to existing devices. Using cables ensures that there will be no breaks or perturbation in communication encountered using remote communications tools. The mobile device 3 forms a cylinder with locations 32 for smart card 5 distributed around its axis of rotation 23.

Figure 5:
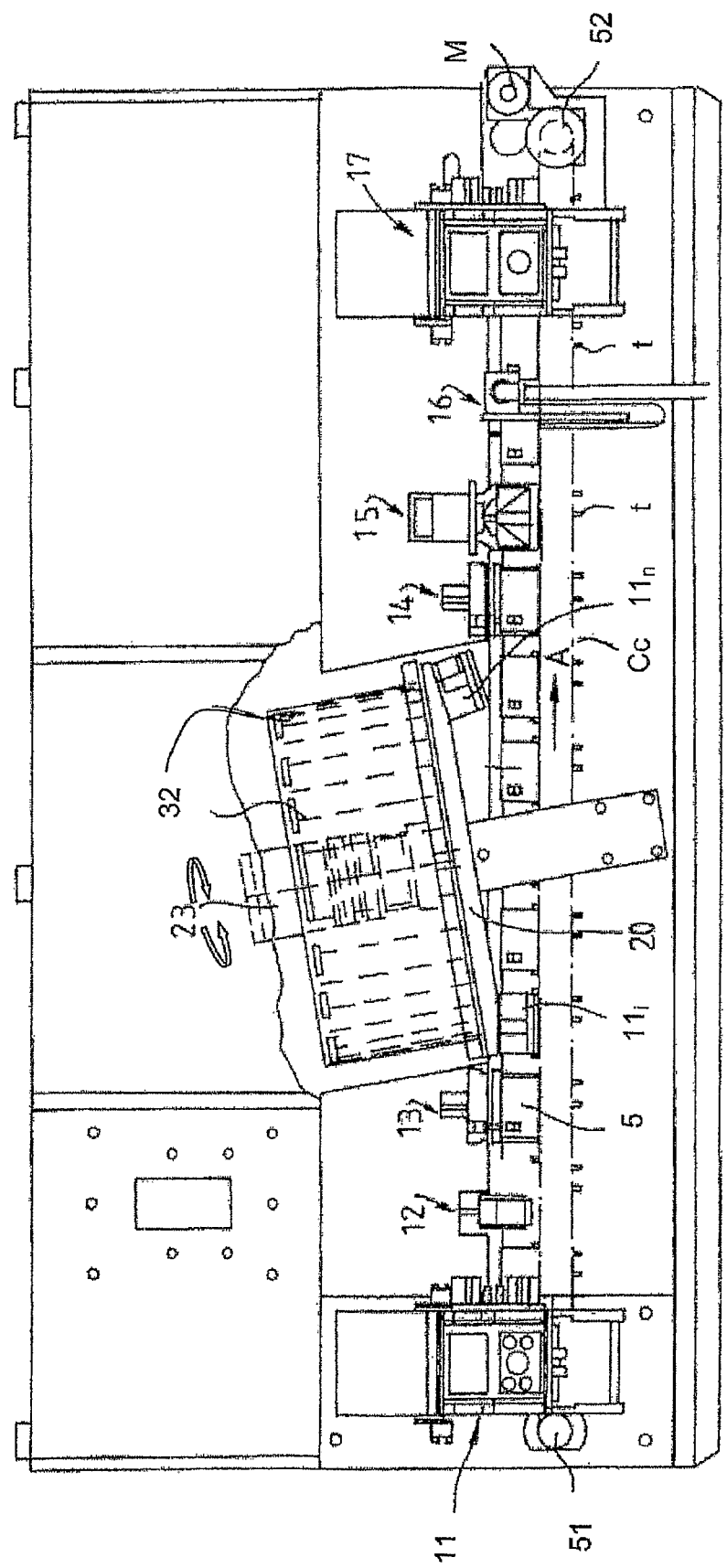
FIG. 5 illustrates a plan view of a machine according to the invention.

The personalisation machine can remain compact, as illustrated in FIG. 5. On the endless belt Cc are mounted at regular intervals, in paired, tabs t whereof the distance between two consecutive tabs t corresponds to the length, or in another configuration as in the illustration of FIG. 5 to the width, of a portable object of the size of a credit card, hereinafter called a smart card 5.

In the non-limiting example of FIG. 5 each pair of tabs t spaced the length of a credit card apart is adjacent to the following pair by a shorter length. The tabs t hold portable objects 4 during shifting on the go part of the path represented by the arrow A, and conveying smart cards from one station to another. An unstacking device 11 distributes the cards from a batch of stacked cards and inserts them one by one between each pair of tabs 31. The cards 5 thus introduced to the transfer path A are then forwarded to an electric test station 12 which uses a simple electric test to eliminate the bad cards, thus ensuring first rapid detection, for example in time of the order of barely 0.5 second.

The unstacking device 11 can comprise one or more input magazines for endless feeding of the machine, with magazines being exchanged in masked time. In an embodiment of the invention, each magazine is removable and has a capacity of the order of 500 cards. The tested cards 5 are then transferred to an ejection station 13 which rejects the bad cards. The cards having successfully passed the electric test are then transferred from the ejection station 13 to the personalisation station. This personalisation station comprises a turning device 3 whereof the axis of rotation 23 is horizontal and parallel to the support platform of the transfer line Cc, t. It can also be inclined relative to the transfer path A.

On the circumference of the turning device 3 there is provided a plurality of connection devices 11*i*, 11*n* of a size slightly less than the cards 5 and having a space between their outer edge and the notched belt Cc. A jack device or equivalent actuator means pushes each card 5 to the device 3 mobile in rotation, once the card 5 has been forwarded to the receiving zone of the connection device 11*i* supported on fixed surfaces of the connection device. This jack is placed at the level of the card introduction and evacuation station.

In the embodiment of FIG. 5, each connection device 11*i* with smart card 5 comprises guiding means and connection means solid with the turning device 3. Such means are for example described in document EP 0 797 167. Linked to each connection head of a connection device 11*i* is an electronic personalisation card 32 placed for example on the face opposite the turning device 3 and oriented radially to the centre of this device 3 mobile in rotation around its axis 23.

After the personalisation step is complete, the connection device 11*i* is forwarded during rotation of the mobile device 3 to the card introduction and evacuation station. The jack is actioned to allow the connection head to lift off. This frees the smart card 5 then, by shifting the belt Cc in the direction of the arrow A FIG. 5, moves the personalised card and at the same time forwards the next smart card in the connection device 11*i* which has just completed personalisation. The personalised card leaving the turning device 3 is transported by the belt Cc to the ejection station 14. This ejection station 14 eliminates the cards 5 having incomplete or defective personalisation. In an embodiment of the invention, if the personalisation succeeded, the card 5 is transferred to the return station 15 to receive its graphic personalisation on one of its faces by a marking station 16.

Finally, and still in reference to FIG. 5, the card can be transported to a classic stacking device 17 where it is stacked in one or more magazines functioning along the same principle as the unstacking device 11, but in the inverse direction. The turning device 3 can thus comprise a large number of connection devices 11*i* each (inked to a personalisation card which manages personalisation of the smart card 5 inserted by the transfer belt Cc into the connection device 11*i* to which the personalisation card is connected. The turning device 3 can thus comprise, for example, 32 or 16 connection devices 11*i* linked to as many personalisation cards.

The control module 40 of the drive means 4 in rotation can be configured to limit each of the rotations of the mobile device 3 to an angle of the order of 360°. The torsion of the bundle of wires 2, 200 is thus limited. This control module 40 can be equipped with control means of at least an angular position taken by the mobile device 3, for example all the angular positions (non-limiting: 16 or 32 in reference to the example with 16 or 32 connection devices) allowing loading of a card 5. The control module 40 can even comprise optical detection means for permanently detecting the angular position taken by the mobile device 3. In an exemplary embodiment the control module 40 can invert the direction of rotation of the mobile device (3) as a function of a detection signal supplied by an optical sensor linked to an angular reference position of the mobile device 1.

To transfer the personalisation data to the exact location 32 containing the smart card 5 or the portable chip object corresponding, the personalisation machine can advantageously comprise:

first identification means (for example optical detector or any detector of angular position of the mobile device 3) for identifying a determined location 32 vis-á-vis a loading station of the loading means;

second identification means of the smart card 5 loaded or to be loaded in the determined location 32, for obtaining an identifier of this smart card 5, this identification for example able to be deduced from an determined order of arrival of the smart cards 5;

means for transmitting to the administration computer system 1 the identifier of the smart card 5 obtained; and an association module in the administration computer system 1 for linking personalisation data to the determined location 32, the association module being arranged to extract personalisation data due to the identifier obtained and for transmitting the personalisation data thus extracted in association with routing data to have the extracted personalisation data arrive at said determined location 32.

As those skilled in the art can appreciate, the means for correlating the smart card 5 to be personalised and sending it to the associated location of personalisation data can be diverse in nature (cf. for example the idea of document EP 1 228 481). A listing of the order of passage of the smart cards 5 and a listing of the successive locations to be loaded can establish the association between personalisation data to be written on the smart cards 5 and the locations 32 to which to route these data. The transmission of personalisation data takes into consideration the type of physical router utilised for communicating between the fixed computer system 1 and the processing devices C. Each processing device C of personalisation data can serve to supply several writing/programming stations formed at the locations 32.

Each of the connection heads can be counted by a detector reporting this information to the control module 40. In an embodiment of the invention, for card introduction and evacuation, the loading means for smart cards positions the smart cards 5 in the locations 32 of the turning device 3 according to an alternating pattern of paired locations, respectively non-paired locations, according to the direction of rotation of the mobile device 3. Otherwise expressed, the loading means can introduce smart cards 5 to a first series of locations separated two by two by an intercalary location when the mobile device 1 turns in a first direction, and can introduce smart cards 5 to a second series of locations corresponding to the intercalary locations when the mobile device 1 turns in a second direction. During rotation according to the first direction, only those cards from the locations 32 of the first series are evacuated and replaced by cards to be personalised. During this rotation, personalisation is completed for the cards 5 connected at the level of the locations 32 of the second series. During rotation according to the second direction, these cards 5 having completed their personalisation (all data having been received) are evacuated and replaced by new cards 5.

According to a particular feature of the invention, the filling/emptying mode of said invention can likewise refer to any filling/emptying mode at a number of modules divisible by the number of programming stations.

Figure 6:
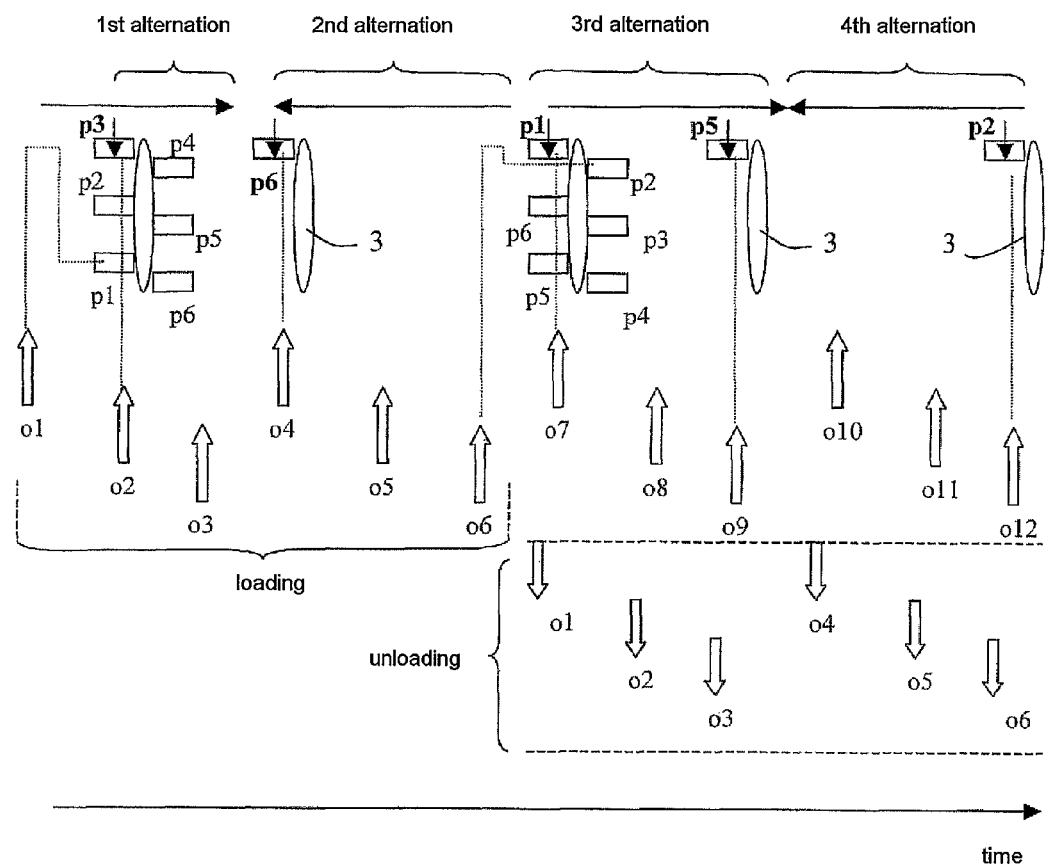
FIG. 6 shows an example of loading/unloading cycles for a personalisation machine according to the invention.

According to the example of FIG. 6, a first series o1, o2, o3 of smart cards 5 can be loaded at the level of unpaired locations of the mobile device 3 during alternating (1st direction of rotation), the arrival of these locations at the level of the unloading station can be ascertained according to the respective pendulum positions p1, p3, p5 of the mobile device 3 associated with loading these non-paired locations. During ensuing alternating (2nd direction of rotation), a second series o4, o5, o6 of smart cards 5 can be loaded at the level of paired locations of the mobile device 3. The pendulum positions p6, p4, p2 of the mobile device likewise serve in this case to determine which location 32 is in a position to be loaded. A loading/unloading cycle can be summarised by the following table, with a simple case of 6 locations:

| Portable chip object | Pendulum position | Personalisation data | Associated location |
|---|---|---|---|
| o1 | p1 | D_o1 | 1 |
| o2 | p3 | D_o2 | 3 |
| o3 | p5 | D_o3 | 5 |
| o4 | p6 | D_o4 | 6 |
| o5 | p4 | D_o5 | 4 |
| o6 | p2 | D_o6 | 2 |

It is understood that each pendulum position p1, p2, p3, p4, p5, p6 is linked by a location identifier 32 allowing the administration computer system 1 receiving information on the pendulum position to transmit to a determined location, among the personalisation data D_o1, D_o2, D_o3, D_o4, D_o5, D_o6, only that associated with the portable chip object housed in this determined location 32. Typically, smart cards 5 arrive linearly at the loading station or card introduction 5. Their arrival order is therefore known to the system 1. The latter has a correspondence table for listing the pendulum positions p1, p2, p3, p4, p5, p6 of the locations 32 provided for each of the cards 5 arriving in the order provided.

After two rotations, the first smart card 5 to be loaded can be unloaded. The unloading or evacuation station can be located beside or at the same place as the loading station. In this way, the order of loading is the same as the order of unloading the smart cards 5 and there is no time loss associated with unuseful rotations of the mobile device 3. With reference to FIG. 6, it is understood that for the four first alternations (two rotations in one direction and two rotations in the opposite direction) the locations 32 of the mobile device 3 can each have been loaded with two smart cards. The portable objects or cards o1, o2, o3, o4, o5, o6, o7, o8, o9, o10, o11, o12 loaded during these four alternations originate from conveying means of the personalisation machine and unloading is completed in the same order as loading, the inversions of rotation being advantageously taken into consideration. Initially, the loading station will therefore successively introduce the smart cards 5 to the locations 32 corresponding to the non-paired pendulum positions p1, p3, p5 then to the locations 32 corresponding to the paired pendulum positions p6, p4, p3 while the direction of rotation is inverse, as shown in the table above. Naturally, the mobile device can comprise many more locations 32, with for example 18 or 36 programming stations, each provided with a location 32 for personalisation of cards 5.

For an alternative direction of rotation occurring at each turn, a smart card 5 in its location 32 can thus be personalised over a period exceeding the duration of a complete turn. A substantial volume of personalisation data can be transferred during this period. In variant embodiments, the mobile device 3 can be placed in rotation on a semi-turn only. It is permitted to make for example 2 turns or more before changing the direction of rotation if the wire or wires used for transmission of data originating from the management system 1 can undergo torsion every 2 turns or slightly more.

In a preferred embodiment of the invention, stop members are provided for preventing rotation of the mobile device 3 beyond one turn. These stop members (not shown here) are for example placed in the trajectory of an element projecting from the mobile device 3. This projecting element can be located on the circumference, on a face or on the axis 23 of the turning device 3. Blockage or stoppage of the means 4 for driving in rotation can be triggered as soon as the projecting element is supported on the stop member. Any other arrangement with one or more mechanical stops can be provided to prevent transmission cables 2, 200 from being pulled out. Any possible errors in movement of rotation of the turning device can thus not generate wastage on the personalisation machine.

With reference to FIGS. 1 to 4, each transmission element 2, 200 for personalisation data can consist of a cable for undergoing torsion between its first and its second end 21, 22. The first end 21 remains attached to a fixed point (fixed in rotation), while the second end 22 follows the movement of rotation of the turning device 3 (end mobile in rotation). The transmission elements 200, organised for example into a bundle of wires, resist torsions exerted in two opposing direction. The set formed by the mobile device 3 is in alternative rotation for example by +/−360°.

In the example of FIG. 1, the transmission element 2 of personalisation data consists of a single cable. The second end 22 is connected to a data redistributor 30 (of <<switch hub>> type for example) connected in the mobile device 3 to a plurality of processing devices C. A connector of the redistributor 30 can form the interface 31 receiving the second end of the cable transmission connected to the fixed part. The processing devices C, connected in parallel to the redistributor 30, are in turn each coupled to at least one of the locations 32 of the mobile device 3 for transferring personalisation data received via the redistributor 30 to the chips of the cards 5 housed in the corresponding locations 32. A connection head is provided in each location 32 for writing the personalisation data in the smart card. This writing can be done via an interface with contact or without contact of the connection head.

Throughout personalisation, at least one card identifier 5 is loaded in one of the processing devices C, as well as the personalisation data relating to this identifier. Certain information concerning the next smart card 5 to be personalised by the same device C can likewise be sent. The information received in advance for the next card 5 for example allows the processing device C to verify the identifier of this next card. This is useful for a processing device C to be able to manage several locations 32, that is, several connection heads. This also allows the device C to route the personalisation data coming from the redistributor 30 as a function of the identifiers, an identifier each time being linked to a single location 32.

It is understood that the cards or objects to be personalised must be followed precisely so as not to register data relative to a first individual then printing on this card or object information relative to a second individual. This is why the order of introduction and evacuation of the smart cards 5 must be managed centrally, at the level of the administration computer system 1. The personalisation machine according to the invention manages this, while ensuring a very high processing rate.

The processing devices C have a high processing speed, with a frequency of the order of 220 MHz, for example for their processor (or equivalent processing unit). The administration computer system 1 has a frequency of 4 GHz for example, that is 18 times higher. It is understood that a mobile device 3 fitted with 18 processing devices C cannot lose speed for the rate of data. In the example of FIG. 1, a single link of IP type is provided (rate greater than 1 Gbps) for connecting a central fixed computer to the turning device 3, this transmission element 2 being connected to one or more Ethernet cards or equivalent communication means 120 (network card, interface managing IP protocol . . . ) of the computer.

The redistributor 30 can store in memory an IP address table for each of the processing devices C and comprises means for distributing the personalisation data received via the transmission element 2 to the processing devices C by consulting the table. Indicative IP address supplied by the administration computer system 1 in the data frames are used for this.

Figure 2:
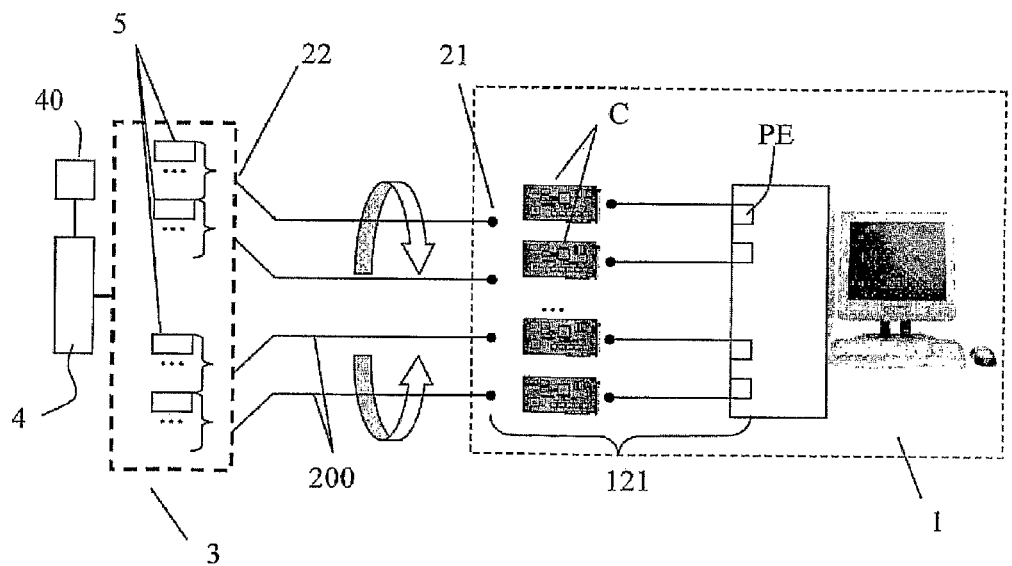

With reference to FIG. 2, the transmission elements 200 of personalisation data consist of several cables connected to the fixed part. The communication means 121 of the computer system 1 comprise a set of communication ports PE, for example of Ethernet type, connected in the fixed set to connectors on one of the processing devices C. These devices C ensure for example transmission of personalisation data to several smart cards 5 loaded in the locations of the same set of locations 32 of the mobile device 3. Each processing device C of the fixed set is connected specifically to a single set among a plurality of sets of locations 32 provided in the mobile device 3 of the machine. The transmission elements 200 have their first end 21 connected to a processing device C, while the second end 22 is received in the mobile device 3 in a zone corresponding to the localisation of the set of locations 32 managed by this same processing device C. In the example of FIG. 2, it can be considered that the digital management system 1 includes the processing devices C for forming the fixed set.

Figure 3:
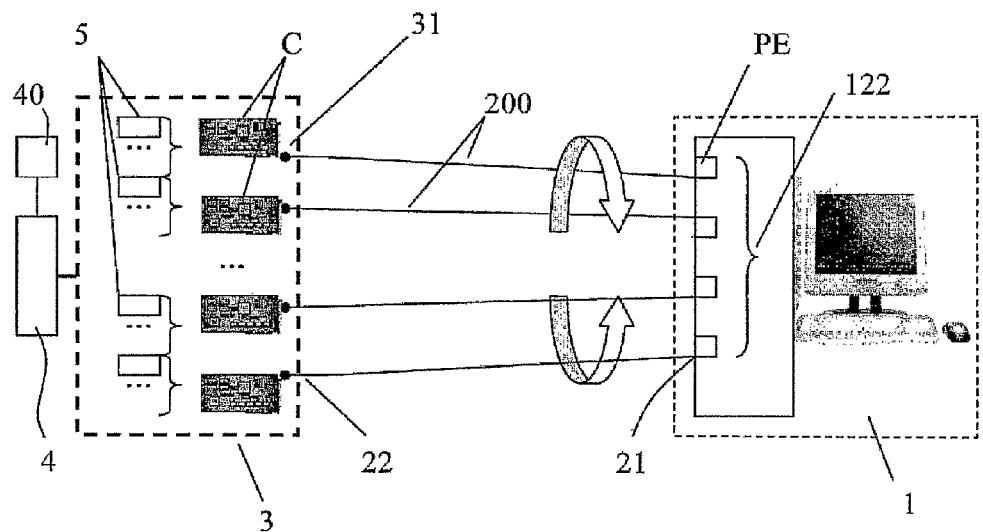

With reference to FIG. 3, the communication means 122 of the computer system 1 comprise communication ports PE, for example Ethernet ports, connected via the wire transmission elements 200 to connectors of the connection interface 31 of the mobile device 3. Each of the connectors is connected in the mobile device 3 to the processing device C provided for transmitting the personalisation data to several smart cards 5 loaded in locations of the same set of locations 32 of the mobile device 3. This embodiment differs from that of FIG. 2 in that the coupling devices C are embedded in the mobile device 3 driven in rotation +/−360°. The rotation in each direction can also naturally be less than or greater than a turn (in this latter case the stops can be cancelled or be mobiles: for examples stops provisionally retractable for letting at least one turn be completed).

Figure 4:
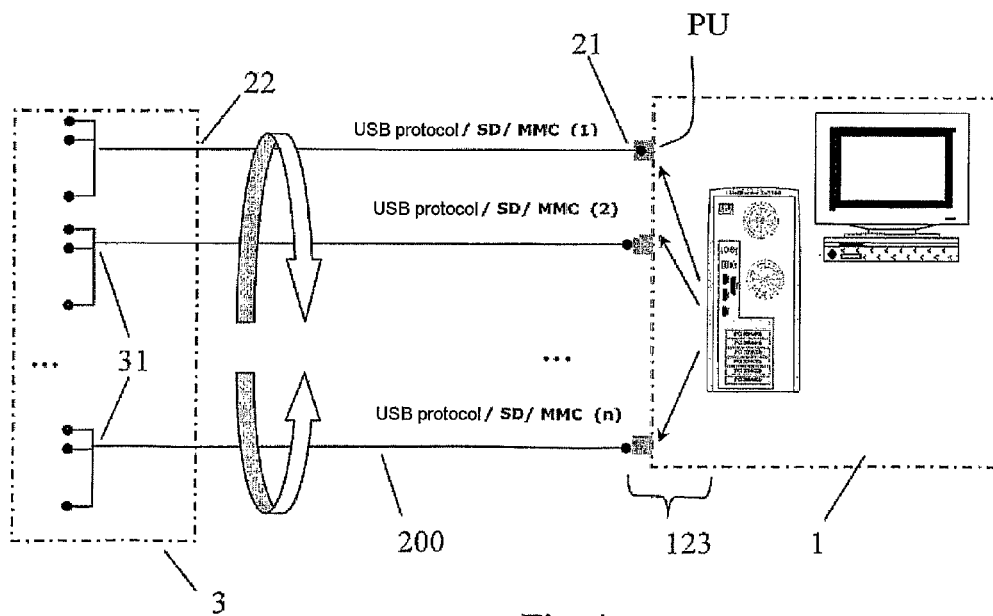

With reference to FIG. 4, the communication means 123 of the computer system 1 comprise communication ports PU connected to USB connectors provided in the connection interface 31 of the mobile device 3. Each of the USB connectors is connected in the mobile device 3 to a router for transmitting the personalisation data to several smart cards 5 loaded in locations of the same set of locations 32 of the mobile device 3. Each connector USB of the mobile device 3 can be specifically connected to a single set among a plurality of sets of locations 32 provided in the mobile device 3 of the machine.

Using the USB protocol (Universal Serial Bus) can be done by means of USB-SD/MMC cards (slots in a computer of the computer system 1 for example). The advantage of this technology is its simplicity and the resulting rapid rate. A number from 18 or 36 USB ports can for example be envisaged for supplying the personalisation data to the locations 32 of the mobile device 3. 18 or 36 USB connection heads will be used in this case.

One of the advantages of the personalisation machine is better management of the data rate capacity coming from the administration computer system 1 and processing a considerable volume of smart cards or similar portable objects. The machine processes in parallel several smart cards 5 without bulk problems. The wire network constitutes between the connection heads (connected or not to processing devices C) and the centralised administration computer system 1 allows rapid personalisation, even for substantial volumes of data to be written on the chip of the cards 5. More than 6000 cards 5 can be programmed per hour.

The invention claimed is:

1. A high-rate personalisation machine of portable objects fitted with a chip, comprising an administration computer system equipped with communication means, at least one transmission element for personalisation data connected by a first end to the communication means of the computer system, at least one mobile device mobile in rotation equipped with routing means for personalisation data to locations of a plurality of locations with portable object, at least one connection interface in the mobile device receiving a second end of said transmission element, and loading means for the portable object for positioning the portable objects in the locations, each of the locations being provided in the mobile device and equipped with means with or without contact for communicating with electronic chip objects, comprising:
 means for driving in rotation for turning the mobile device around an axis of rotation while said computer system remains fixed, the means for driving in rotation being of bi-directional type and linked to a control module cyclically inverting the direction of rotation of the mobile device, for limiting restrictions on feed elements of the control module and on said transmission element, said transmission element thus having a data transmission capacity greater than a hundred megabytes per second;
 first identification means for identifying a determined location vis-a-vis a loading station of the loading means;
 second identification means of the portable object loaded or to be loaded in the determined location, for obtaining an identifier of the portable object;
 means for transmitting to the administration computer system the identifier of portable object obtained; and
 an association module in the administration computer system for linking personalisation data to the determined location, the association module being arranged to extract personalisation data due to the identifier obtained and for transmitting the personalisation data thus extracted in association with routing data to have the extracted personalisation data arrive at said determined location.

2. The personalisation machine according to claim 1, in which the control module is configured to limit each of the rotations of the mobile device to an angle of the order of 360°.

3. The personalisation machine according to claim 1, in which the control module comprises control means of at least one angular position taken by the mobile device.

4. The personalisation machine according to claim 1, wherein the control module comprises detection means for permanently verifying the angular position taken by the mobile device.

5. The personalisation machine according to claim 1, comprising stop members for preventing rotation of the mobile device beyond one turn.

6. The personalisation machine according to claim 1, wherein the mobile device forms a cylinder with locations for portable object distributed around the axis of rotation.

7. The personalisation machine according to claim 1, wherein each transmission element for personalisation data consists of a cable for undergoing torsion between the first and the second end.

8. The personalisation machine according to claim 1, wherein said transmission element of personalisation data consists of a single cable, the second end-being connected to a data redistributor connected in the mobile device to a plurality of processing devices, each coupled to at least one of the locations for transferring personalisation data received via the data redistributor to the portable objects housed in the corresponding locations.

9. The personalisation machine according to claim 8, wherein the data redistributor stores in a memory an IP address table for each of the processing devices-and comprises means for distributing personalisation data received via the transmission element to the processing devices by consulting the table. using IP address indicators supplied by the administration computer system.

10. The personalisation machine according to claim 1, wherein several cables connect the mobile device to a fixed set including the administration computer system.

11. The personalisation machine according to claim 10, wherein the communication means of the computer system comprise communication ports each linked in the fixed set to a connector on a processing device for transmitting the personalisation data to several portable objects with loaded chip in locations of the same set of locations of the mobile device, each processing device of the fixed set being specifically connected to a single set among a plurality of sets of locations provided in the mobile device of the machine.

12. The personalisation machine according to claim 10, wherein the communication means of the computer system comprise communication ports connected via the cables to the connectors of the connection interface of the mobile device, each of the connectors being connected in the mobile device to a processing device provided for transmitting the personalisation data to several portable objects with loaded chip in locations of the same set of locations of the mobile device, each processing device being specifically connected to a single set among a plurality of sets of locations provided in the mobile device of the machine.

13. The personalisation machine according to claim 10, wherein the communication means of the computer system comprise communication ports connected to USB connectors provided in the connection interface of the mobile device, each of the USB connectors being connected in the mobile device to a router for transmitting the personalisation data to several portable objects with loaded chip in locations of the same set of locations of the mobile device, each USB connector of the mobile device being specifically connected to a single set among a plurality of sets of locations provided in the mobile device of the machine.

14. The personalisation machine according to claim 1, comprising a transfer line of portable objects for introducing and extracting the portable objects from the mobile device, the axis of rotation of the mobile device being placed transversally relative to the transfer line, each transmission element extending according to a specific direction parallel to the axis of rotation.

15. The personalisation machine according to claim 8, wherein each processing device is connected to the administration computer system and is placed radially in the mobile device in rotation, the administration computer system of personalisations managing the set of portable objects housed in the locations of the mobile device.

16. The personalisation machine according to claim 1, wherein the loading means are arranged for loading a first series of locations separated two by two by an intercalary location when the mobile device turns in an first direction, and for loading a second series of locations corresponding to the intercalary locations when the mobile device turns in a second direction.

17. The personalisation machine according to claim 1, wherein the control module inverts the direction of rotation of the mobile device as a function of a detection signal supplied by a sensor linked to an angular reference position of the mobile device.

18. The personalisation machine according to claim 1, wherein the association module extracts the personalisation data by consulting a correspondence table stored in the administration computer system, by using the identifier obtained as input key of the correspondence table.

19. The personalisation machine according to claim 1, wherein the communication means of the administration computer system are arranged for transmitting personalisation data including numerical data, graphic or alphanumerical data, biometric data, or any combination of these types of data.

\* \* \* \* \*